United States Patent
Kirscht et al.

(10) Patent No.: US 7,987,336 B2
(45) Date of Patent: Jul. 26, 2011

(54) REDUCING POWER-ON TIME BY SIMULATING OPERATING SYSTEM MEMORY HOT ADD

(75) Inventors: Joseph Allen Kirscht, Rochester, MN (US); Sumeet Kochar, Apex, NC (US); Barry Alan Kritt, Raleigh, NC (US); William Bradley Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/120,383

(22) Filed: May 14, 2008

(65) Prior Publication Data
US 2009/0287900 A1 Nov. 19, 2009

(51) Int. Cl.
*G06F 12/00* (2006.01)
(52) U.S. Cl. ........................................ 711/173
(58) Field of Classification Search .................. None
See application file for complete search history.

(56) References Cited

U.S. PATENT DOCUMENTS

| | | |
|---|---|---|
| 2004/0158701 A1 | 8/2004 | Merkin |
| 2005/0216721 A1 | 9/2005 | Zimmer et al. |
| 2007/0260672 A1* | 11/2007 | Almeida et al. ............... 709/203 |
| 2008/0052483 A1* | 2/2008 | Rangarajan et al. .......... 711/170 |

OTHER PUBLICATIONS

"Hot-Add Memory Support in Windows Server 2003", Windows Hardware Developer Central, Dec. 10, 2004, 4 pages, Microsoft, USA.

* cited by examiner

*Primary Examiner* — Hiep T Nguyen
(74) *Attorney, Agent, or Firm* — Matthew C. Zehrer

(57) ABSTRACT

This invention generally provides a method for speeding up system boot time, by initializing a subset of memory during the system firmware test/initialization, and allowing the system to boot an operating system with this subset of installed memory. While the system is completing the operating system boot with the subset of installed memory, a remainder of the installed system memory is being initialized/tested. When the initialization the remainder of system memory is completed (and after the OS has booted), the SMI handler is invoked. The SMI handler then simulates a physical memory "Hot Add" event, and reports the event to the OS. This allows much of the memory initialization/test activity to occur in parallel with the firmware initialization/test and operating system startup processes.

20 Claims, 3 Drawing Sheets

REDUCING POWER-ON TIME BY SIMULATING OPERATING SYSTEM MEMORY HOT ADD

SUMMARY OF THE INVENTION

The present invention generally relates to the power-on of a computer, and more specifically a method for reducing the power-on time of a computer.

During the power-on of a computer there is a sequence of events that occur before a user can utilize the computer. Early in this sequence of events, system firmware (frequently called Power on Self Test/Basic Input Output System—POST/BIOS—on Intel PC systems) initializes and tests the system hardware. This initialization and testing can take several minutes to complete, which delays subsequent steps such as loading the operating system (OS) and other applications. Reducing this delay is important to satisfying the computer customer.

There are many items in the computer that need to be initialized and/or tested. Particularly the item that usually takes the greatest time to initialize is system memory. In many computer systems, the system memory uses Error Checking & Correction (ECC) algorithms/circuitry to detect and/or correct failures of particular bits in the memory array. Initializing ECC memory typically consists of writing data to every memory location thereby setting the memory to known values with matching ECC bits. In addition, this memory can be read back in order to validate the memory/ECC, and additionally can be written/verified with other data patterns to ensure the integrity of the system memory. This must be completed before the OS is loaded, since accessing memory before the memory is verified or before ECC bits are set, can result in uncorrectable memory errors which could cause data integrity problems and/or systems halts.

Some systems use memory controllers that have the ability to aid in the memory initialization/testing, by providing capabilities to set (write known values to memory), and scrub (read/verify/correct memory) without the system processor being involved (and as a result, at a much faster rate). Even with this type of memory controller, it often takes 4-10+ minutes to perform the memory initialization/testing before the operating system can boot.

In a particular embodiment a method to decrease an electronic system power-on time by decreasing the system initialization time is completed by logically dividing the installed system memory into two regions wherein a first region is a small subset of the memory. In another embodiment the size of the first region is greater than the amount required for system firmware (e.g., POST/BIOS, etc.) to complete system initialization, and for the OS to startup. In another embodiment the first region has enough memory to allow applications to begin running. In another embodiment the actual size of the first region is configurable by the user. In another embodiment a second region is the remainder of the memory. In yet another embodiment the second region is the large majority of the system memory.

In another embodiment the method to decrease system initialization/testing time is completed by performing the memory initialization on the first memory region. In another embodiment the method is completed by indicating in the Advanced Configuration and Power Interface (ACPI) table that the first memory region as being installed and available.

In another embodiment the method to decrease system initialization time is completed by beginning the memory initialization on the second memory region. In another embodiment the memory controller is configured to generate a System Management Interface (SMI) request when the memory initialization is completed.

In another embodiment the method to decrease system initialization time is completed by continuing the POST/BIOS booting process and operating system loading using only the first memory region. In another embodiment the POST/BIOS booting process and operating system loading is concurrent with the memory initialization on the second memory region. In yet another embodiment when the memory controller has completed the scrubbing of the second region, it generates an SMI request.

In another embodiment the method to decrease system initialization time is completed by simulating the addition of physical memory utilizing the SMI handler code. In another embodiment the OS starts utilizing the second region of memory as if it were newly added physical memory.

This and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Some computer systems (such as IBM x460) and operating systems (such as Windows Server 2003, Enterprise Edition) support the capability known as Hot Memory Add. This capability allows for the addition of physical memory while the hardware is powered on, and the operating system is running. This is accomplished by 1) sensing circuitry on the computer that senses memory latch movement, and as a result, SMI code is invoked to control power and initialization of memory, 2) when memory has been configured, the operating system is notified of a memory change event (using ACPI), and then 3) the operating system determines the new memory configuration, and begins using the memory that has been "Hot Added".

This invention generally provides a method for speeding up system boot time, by initializing a subset of memory during the system firmware test/initialization time, and allowing the system to boot an operating system with this subset of installed memory. While the system is completing operating system booting with the subset of installed memory, a remainder of the installed system memory is being initialized/tested. When the memory controllers or system firmware have began/completed initializing the remainder of system memory (and after the OS has booted), the SMI handler is invoked. The SMI handler then simulates a physical memory "Hot Add" event, and reports the event to the OS. This allows much of the memory initialization/test activity to occur in parallel with the firmware initialization/test and operating system startup processes, reducing the time from power on to OS booting.

Figure 1:
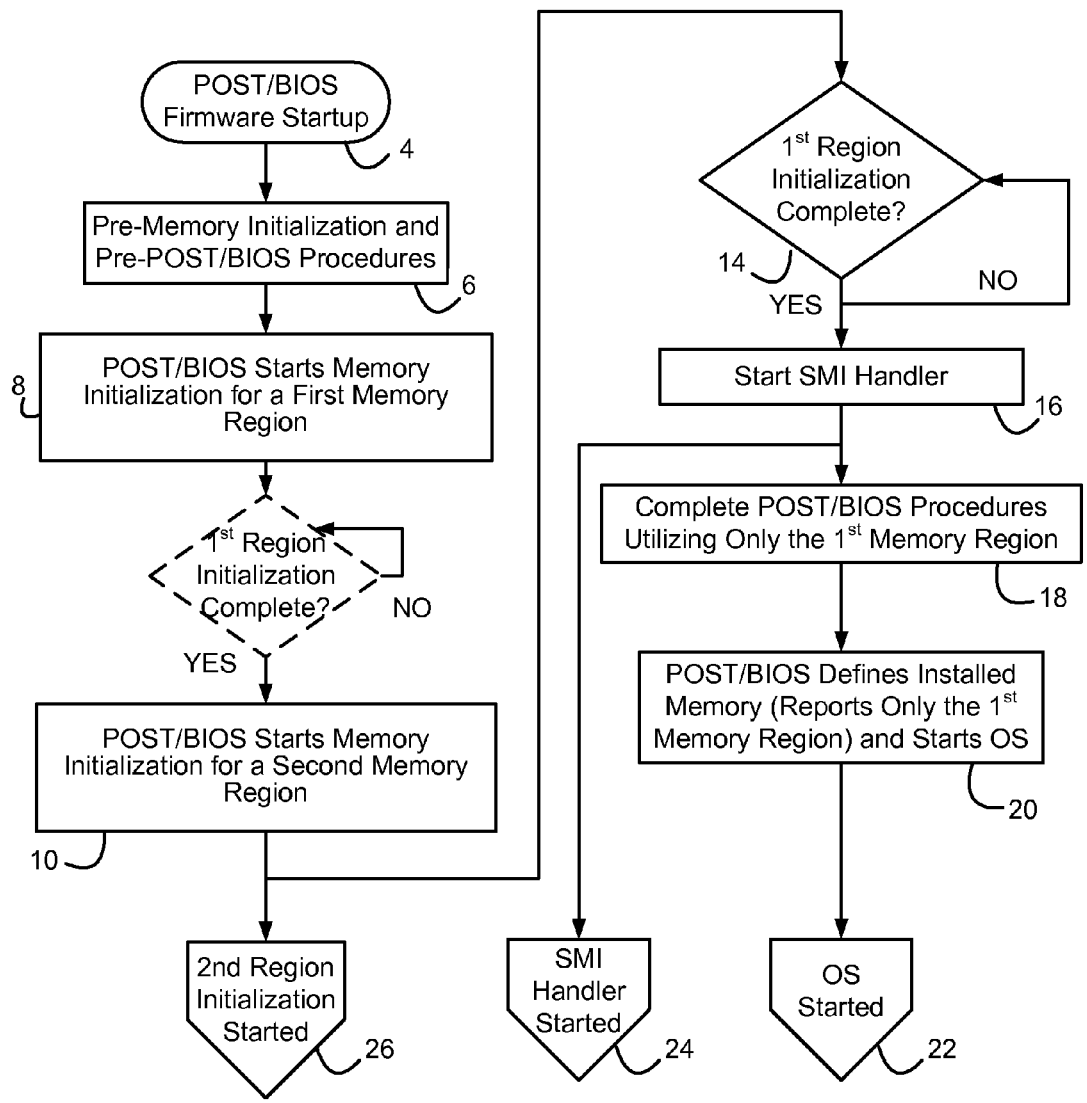
FIG. 1 depicts a POST/BIOS flow diagram prior to the operating system boot, according to an embodiment of the present invention.

Please refer to FIG. 1. FIG. 1 depicts a system firmware (i.e., POST/BIOS, etc.) flow diagram prior to the operating system boot, according to an embodiment of the present invention. The POST/BIOS flow process begins with the POST/BIOS Firmware Startup (block 4). Subsequently, Pre-Memory Initialization and Pre-POST/BIOS procedures occur (block 6). POST/BIOS procedures and/or memory initialization or testing and/or memory scrub occur in a first memory region (block 8). In an embodiment, the first memory region is one of two logical divisions of a system memory. In another embodiment, the first memory region is a relatively small amount of memory when compared to a second memory region. The second memory region is the remainder of the system memory. The second memory region would typically be the large majority of the system memory. In a particular embodiment, the size of the first memory region is larger than the amount of memory required for the POST/BIOS procedures to complete and for the operating system to boot. In another embodiment the first memory region is large enough for system applications to begin running. In another embodiment, the actual size of the first memory region may be configurable by a user. In another embodiment, once the POST/BIOS procedures and/or memory initialization and/or memory scrub complete for the first memory region, the ACPI table is set to show the first memory as being installed and available (SRAT table).

POST/BIOS procedures and/or memory initialization/testing and/or memory scrub occur for the second memory region (block 10). Since the first memory region is smaller than the second memory region, the POST/BIOS procedures, memory initialization, and memory scrub are completed faster for the first memory region as compared to the second memory region. In another embodiment, the POST/BIOS procedures, memory initialization, and memory scrub for the second memory region are completed only after the same is completed for the first memory region. The POST/BIOS procedures and/or memory initialization/testing and/or memory scrub for the second memory region relate to further processes, discussed infra, starting at block 26.

Once the memory initialization/test and/or the memory scrub are completed for the first memory region (block 14), the SMI Interrupt Handler is started (block 16). The SMI Interrupt Handler relates to further processes, discussed infra, starting at block 24. The POST/BIOS procedures are completed utilizing only the first memory region (block 18). The POST/BIOS defines the installed memory, reporting only the first region memory, and starts the operating system (block 20). The OS start relates to further process, discussed infra, starting at block 22.

Figure 2:
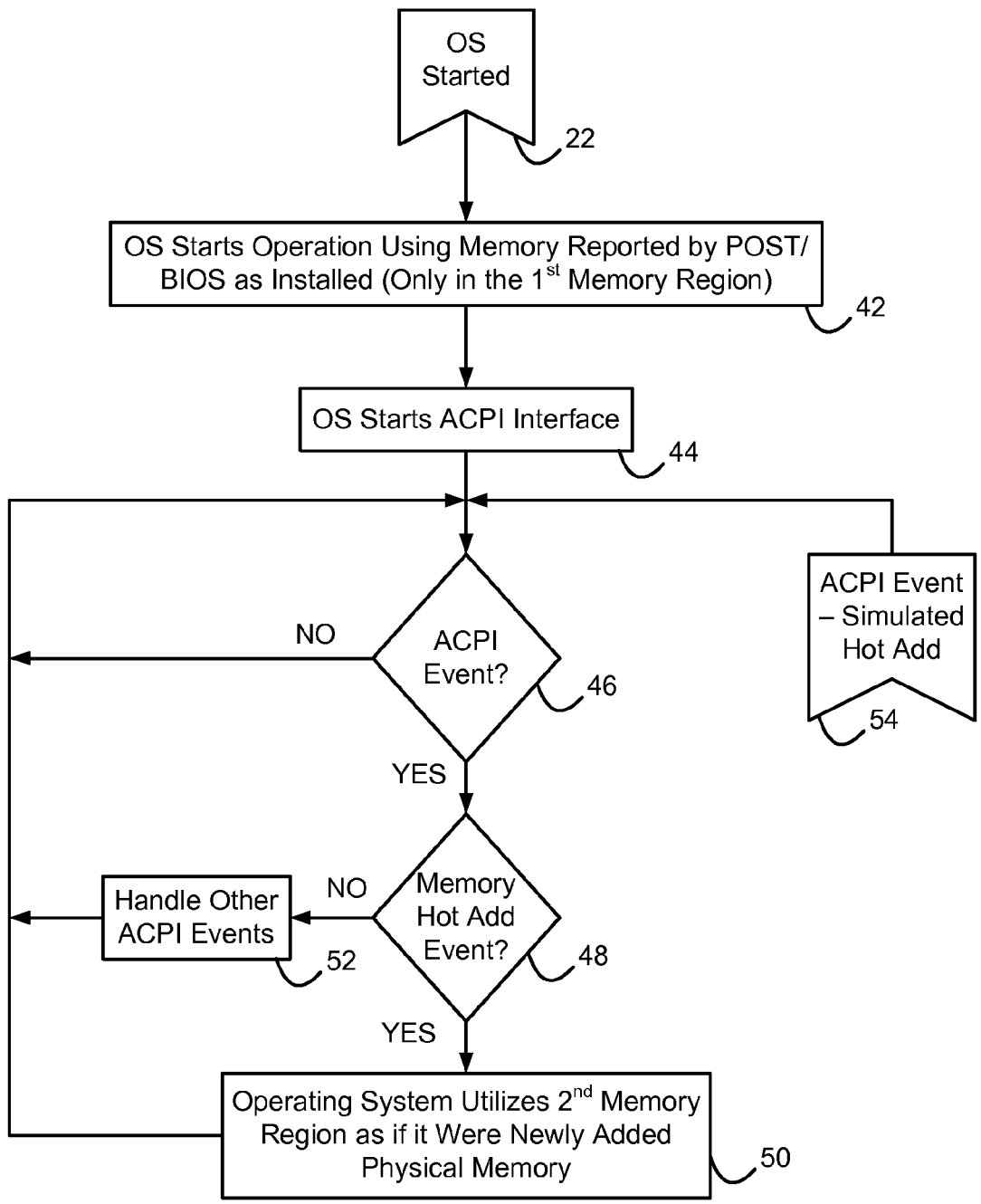
FIG. 2 depicts a simulated memory hot add flow diagram after the operating system boot, according to an embodiment of the present invention.

Please refer to FIG. 2. FIG. 2 depicts a simulated memory hot add flow diagram after the operating system boot, according to an embodiment of the present invention. The simulated memory hot add flow process begins at block 22. The operating system starts operation using memory reported by POST/BIOS as installed (block 42). The memory reported is the memory from the first region. Subsequently, the operating system starts the ACPI interface. In a certain embodiment the ACPI table is set to show that the first memory region is installed and available (SRAT table).

The SMI Handler code simulates the addition of physical memory (block 54). This simulation event is discussed infra.

Subsequently the operating system starts the ACPI interface, thereby allowing for ACPI events (block 44). If there is an ACPI event (block 46) and a memory hot add event (block 48), the memory reported as hot plugged is added to the memory pool (i.e., system memory, etc.), (block 50). In other words the operating system starts utilizing the second memory region as if it were newly added physical memory. If there has not been a simulated hot add event, but the operating system has issued an ACPI event, the OS processes the other ACPI event(s) (i.e., non memory hot add event), (block 52).

Figure 3:
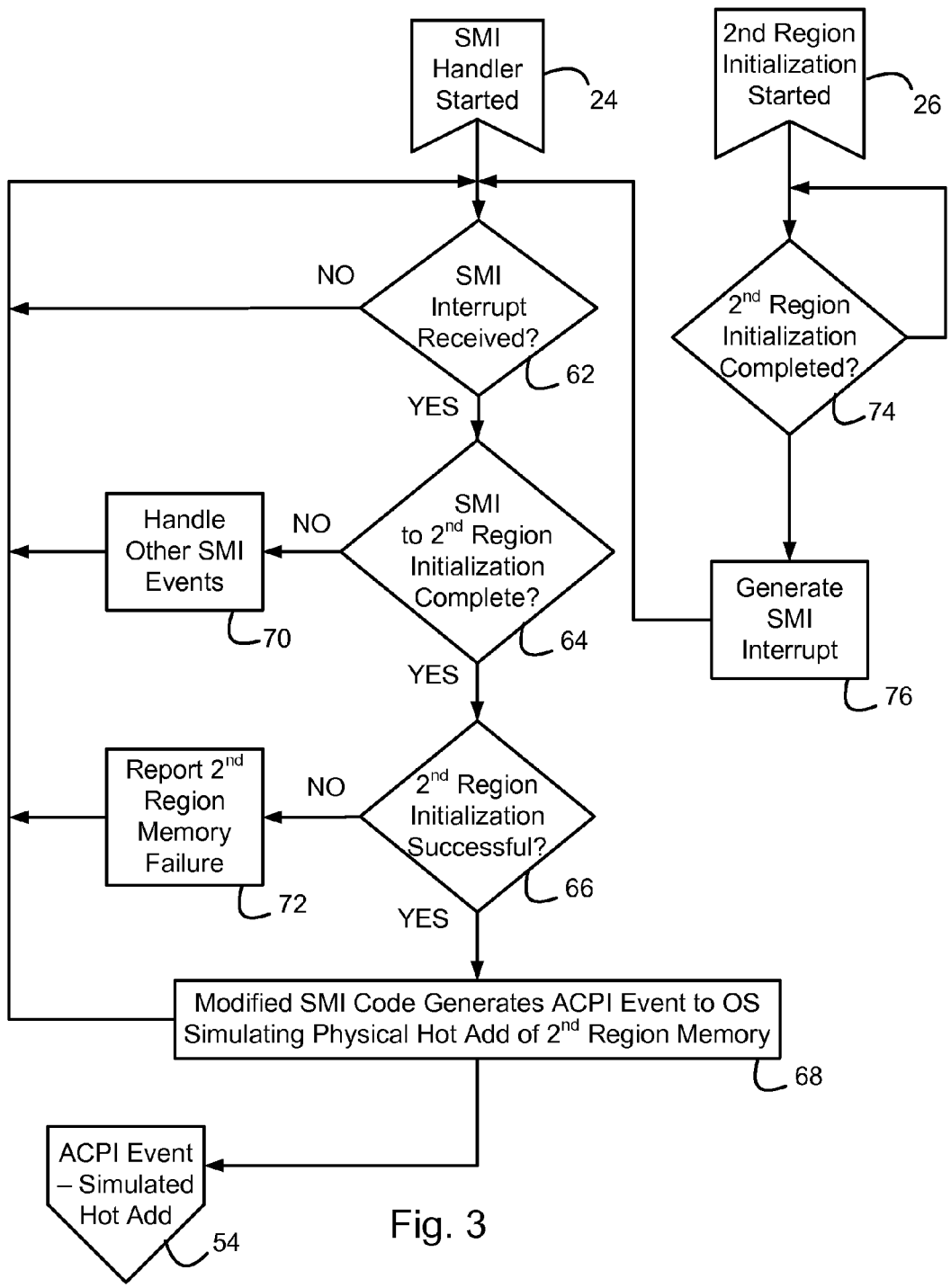
FIG. 3 depicts a simulated memory hot add flow diagram after the operating system boot, according to an embodiment of the present invention.

Please refer to FIG. 3. FIG. 3 depicts a simulated memory hot add flow diagram after the operating system boot, according to an embodiment of the present invention. FIG. 3 further describes a process for generating an ACPI event simulating a memory hot add event (i.e., block 54). The process for generating an ACPI event simulating a memory hot add event begins at blocks 24 and 26 (blocks 24 and 26 were mentioned above). The SMI Handler starts (block 24) and the second memory region initialization/scrub starts (block 26). Once the second memory region completes the initialization/scrub (block 74), a SMI interrupt is generated (block 76).

If an SMI Interrupt is received (block 62), and there is an SMI because the second region initialization/scrub is complete (block 64), and if the second region initialization is successful (block 66) a modified SMI code generates an ACPI event to the operating system thereby simulating the memory hot add of the second region memory (block 68). In an SMI interrupt is received (block 62) but the SMI event is not due to the second region initialization being complete (block 64), the SMI handler processes the other SMI events (block 70). If an SMI Interrupt is received (block 62), and there is an SMI because the second region initialization/scrub is complete (block 64), but the second region initialization/scrub was not successful (block 66), a report is generated indicating that the second region initialization/scrub failed (block 72).

Please note that various embodiments of the methodology require memory scrubbers that can define start/stop scrub regions based on physical addresses (Such as address range of 0-2 GB), since that is how memory is seen by the system processor. Some memory scrubbers operate after memory address translation has take place, and scrub with a sequence based on memory subsystem addressing (i.e., addressed by rank, banks, rows, columns, etc.)

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "method", or other meaningful nomenclature. Therefore, it is desired that the embodiments described herein be considered in all respects as illustrative, not restrictive, and that reference be made to the appended claims for determining the scope of the invention.

The invention claimed is:

1. A computer system comprising:
 a memory partitioned into a first region and a second region, the first region being relatively small as compared to a second region;
 a memory controller configured to initialize the first region;

an operating system utilizing the first region upon first region initialization, and;

a System Management Interface (SMI) handler to simulate a physical hot add of the second region to the operating system.

2. The computer system of claim 1 wherein the memory controller begins to initialize the second region upon beginning the initialization of the first region, and wherein the operating system utilizes both the first region and second region upon the simulated physical hot add event.

3. The computer system of claim 2 wherein the operating utilizes the second region as if it were newly added physical memory upon the simulated physical hot add event.

4. The computer system of claim 3 wherein the SMI handler is also configured to adjust a Advanced Configuration and Power Interface (ACPI) table to notify the operating system of the simulated physical hot add event.

5. A method for initializing a computer system comprising:
completing the initializing of a first region of system memory being relatively small as compared to a second region of system memory;
starting initialization for the second region of system memory;
starting a operating system utilizing only the first region of system memory;
simulating a physical hot add of the second region of system memory, and;
allowing the operating system to utilize both the first region of system memory and the second region of system memory.

6. The method of claim 5 wherein the first region is a relatively small amount of the system memory as compared to the second region.

7. The memory of claim 6 wherein simulating a physical hot add of the second region memory is completed only upon the completion of the memory initialization for the second region.

8. The method of claim 7 wherein completing memory initialization for the first region further comprises:
adjusting a Advanced Configuration and Power Interface (ACPI) table to show the first region as being initialized.

9. The method of claim 8 wherein starting memory initialization for the second region further comprises:
generating a System Management Interface (SMI) request upon initialization of the second region.

10. The method of claim 6 wherein a memory controller generates the SMI request.

11. The method of claim 6 wherein simulating a physical hot add of the second region memory is completed by a SMI handler.

12. The method of claim 11 wherein the SMI handler further adjusts the ACPI table and notifies the system operating system of a memory configuration change.

13. A computer program product for system initialization, the computer program product comprising:
a computer readable storage medium having computer readable program code embodied therewith, the computer readable program code that when executed by a computer causes the computer to perform a method comprising:
completing the initializing of a first region of system memory;
starting initialization for a second region of system memory;
starting a operating system utilizing only the first region of system memory;
simulating a physical hot add of the second region of system memory, and;
allowing the operating system to utilize both the first region of system memory and the second region of system memory.

14. The computer program product of claim 13 wherein the first region of system memory is a relatively small amount of the system memory as compared to the second region of system memory.

15. The computer program product of claim 14 wherein the simulating a physical hot add is completed only upon the completion of the memory initialization for the second region of system memory.

16. The computer program product of claim 15 wherein the completing the initializing of a first region of system memory comprises:
adjusting a Advanced Configuration and Power Interface (ACPI) table to show the first region as being initialized.

17. The computer program product of claim 15 wherein the starting initialization for a second region of system memory comprises:
generating a System Management Interface (SMI) request upon initialization of the second region of system memory.

18. The computer program product of claim 15 wherein a memory controller is directed to generate the SMI request.

19. The computer program product of claim 15 wherein a SMI handler is directed to simulate a physical hot add of the second region memory.

20. The computer program product of claim 19 wherein the SMI handler is further directed to adjust the ACPI table and notify the operating system of the simulated physical hot add event.

* * * * *